(12) United States Patent
Severson

(10) Patent No.: US 7,953,552 B2
(45) Date of Patent: May 31, 2011

(54) GPS NAVIGATION CODE SYSTEM

(76) Inventor: Gary Severson, Franklin Lakes, NJ (US)

( * ) Notice: Subject to any disclaimer, the term of this patent is extended or adjusted under 35 U.S.C. 154(b) by 0 days.

(21) Appl. No.: 12/313,585

(22) Filed: Nov. 21, 2008

(65) Prior Publication Data

US 2010/0131199 A1    May 27, 2010

(51) Int. Cl.
*G01C 21/30* (2006.01)
*G08G 1/123* (2006.01)
*G01S 13/78* (2006.01)

(52) U.S. Cl. .................. 701/209; 701/202; 340/995.19; 342/46; 342/357.21

(58) Field of Classification Search .......... 701/200–226; 340/5.84, 460, 988–996; 342/57, 357.52, 342/357.55, 357.56, 357.57; 455/511, 563, 455/116, 67.7
See application file for complete search history.

(56) References Cited

U.S. PATENT DOCUMENTS

| | | | |
|---|---|---|---|
| 5,765,123 A | 6/1998 | Nimura et al. | 701/208 |
| 5,941,930 A | 8/1999 | Morimoto et al. | 701/201 |
| 6,091,785 A * | 7/2000 | Lennen | 375/316 |
| 6,339,744 B1 | 1/2002 | Hancock et al. | 701/201 |
| 6,597,983 B2 * | 7/2003 | Hancock | 701/200 |
| 7,103,472 B2 | 9/2006 | Itabashi | 701/200 |
| 7,292,937 B2 | 11/2007 | Kuroda et al. | 701/209 |
| 2003/0036842 A1 * | 2/2003 | Hancock | 701/200 |
| 2005/0021341 A1 * | 1/2005 | Matsubara et al. | 704/275 |
| 2007/0078598 A1 * | 4/2007 | Watanabe et al. | 701/211 |
| 2008/0113647 A1 * | 5/2008 | Czajkowski et al. | 455/407 |
| 2008/0133124 A1 | 6/2008 | Sarkeshik | 701/201 |
| 2008/0222127 A1 * | 9/2008 | Bergin | 707/5 |
| 2008/0263095 A1 * | 10/2008 | Porter, III | 707/104.1 |
| 2009/0021425 A1 * | 1/2009 | Cameron et al. | 342/357.09 |
| 2009/0112459 A1 * | 4/2009 | Lin | 701/206 |
| 2009/0121946 A1 * | 5/2009 | Morse | 343/702 |
| 2009/0143937 A1 * | 6/2009 | Craig | 701/37 |

OTHER PUBLICATIONS

"Magellan Does the Dash Thing: Maestro Elite 5340 Connected GPS with Google Local Search to Feature Unparalleled Ease of Use with One Touch Acess to User Favorites," @ http://gizmodo.com/341113/magellan-does-the-dash-thing-maestro-elite-5340%252Bgprs-connected-gps-with-google-local-search.

* cited by examiner

*Primary Examiner* — Jack Keith
*Assistant Examiner* — Muhammad Shafi
(74) *Attorney, Agent, or Firm* — Ernest D. Buff; Ernest D. Buff & Associates LLC; Harry Anagnostopoulos

(57) ABSTRACT

A GPS navigation code device has GPS features and easy address retrieval means built in, enabling a driver to retrieve and request directions to an address without taking his eyes off the road. The user pre-programs the GPS navigation code device with a plurality of addressees or points of interest and assigns unique navigation codes for each. The navigation code is entered using keyboard or recorded speech pattern. The processor in the GPS navigation code device records address, navigation code and speech pattern in three linked databases. While driving, the user presses a special address search mode key and inputs the unique navigation code by keyboard or speech pattern. The GPS navigation code device displays the address and the user accepts the displayed address by pressing special key. The GPS navigation code device then calculates and displays directions to the address, and provides additional guidance by speech on a turn-by-turn basis.

7 Claims, 1 Drawing Sheet

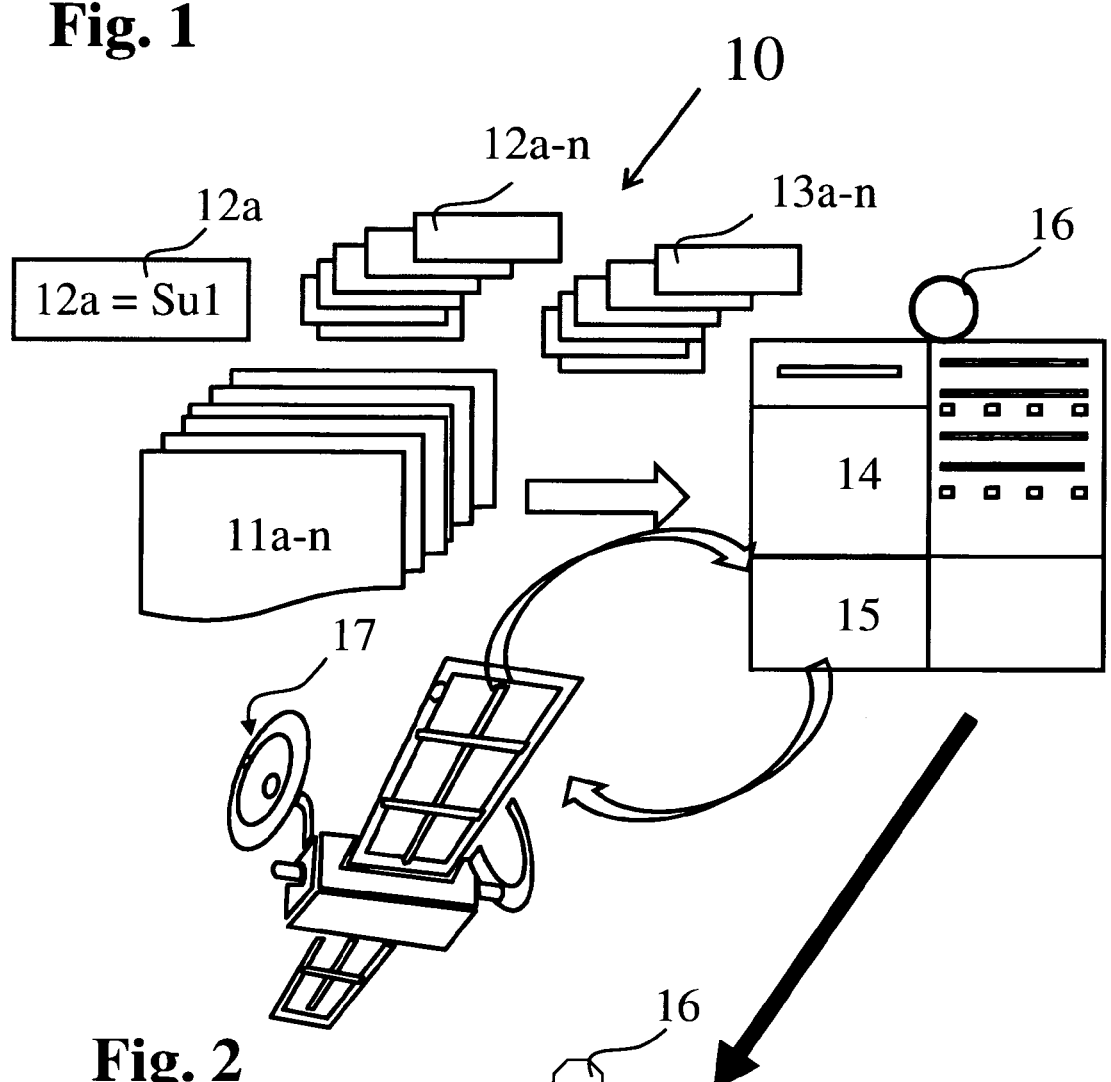
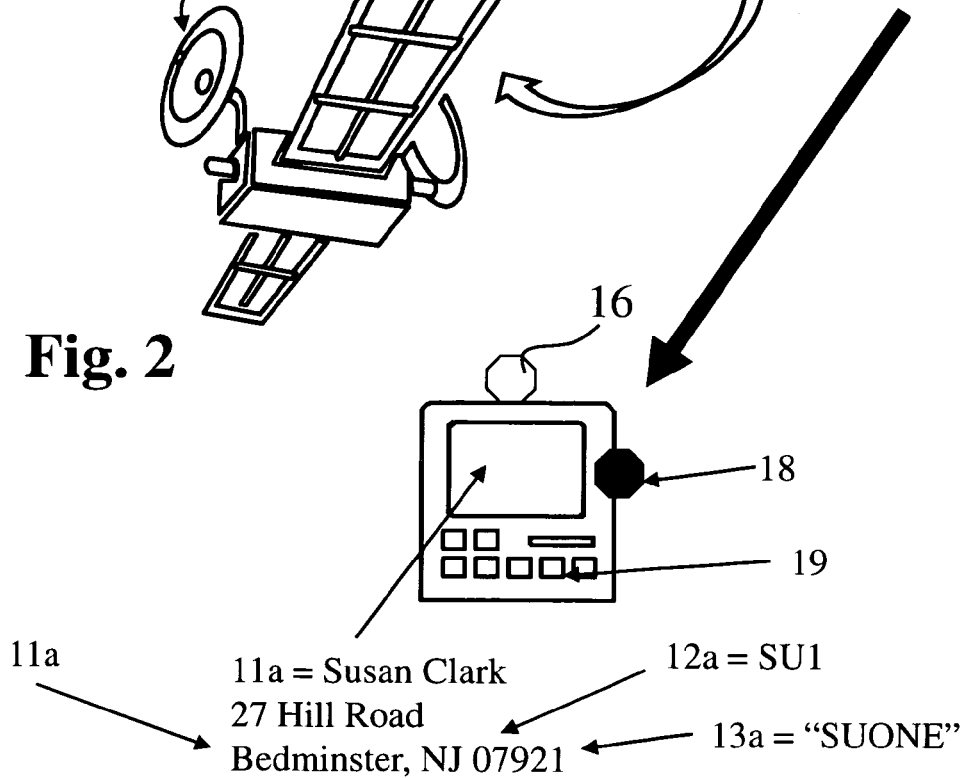

GPS NAVIGATION CODE SYSTEM

BACKGROUND OF THE INVENTION

1. Field of the Invention

The present invention relates to a GPS/navigation system having residential or address search requests; and more particularly, to a system wherein residential or search requests are accomplished by through entry of unique, short minimal keystrokes involving unique navigation codes instead of lengthy address information, such as street name, street address, city and state.

2. Description of the Prior Art

A number of GPS systems with various functionalities are known. These GPS systems generally require manual entry of address or business names for requesting driving direction instructions. Such manual entry requires numerous key strokes, making data entry hazardous unless the car is parked.

U.S. Pat. No. 5,765,123 to Nimura et al. discloses a navigation system. The user inputs a telephone number followed by selecting a point in a map that is displayed. The navigation system then directs the user to the selected map location, using GPS. The association between the telephone number and the map location is stored in a CD ROM or floppy disk. Entering a telephone number requires inputting at least ten numbers. Such activity is complicated, and would likely require a driver/user to take his or her eyes off the road.

U.S. Pat. No. 5,941,930 to Morimoto et al. discloses a navigation system. This navigation system includes input means for entering a telephone number and user selected map location, an information storage device for storing telephone-number data, in which a location name inclusive of a set of coordinates is stored for each telephone number. Address data in which an address is stored for each set of coordinates and map data. A central processor has retrieval means for telephone-number, location coordinates and location name, which correspond to a telephone number entered, and display means for displaying (i) a map centered on the location and (ii) direction instructions for the location name retrieved by the central processor. This navigation system requires entry of a telephone number and retrieved corresponding address for the navigation system to compute directions. This amount of entry of information of a telephone number and map location is cumbersome for the driver on the road. It requires the driver to look away from the road and focus on the data entry process, which presents a dangerous driving condition.

U.S. Pat. Nos. 6,339,744 and 6,597,983 to Hancock et al. disclose a geographic location referencing system and method. This system defines a grid and proprietary addresses of selected locations within a geographical area. It is characterized in that the grid addresses are defined in relation to a grid and can be easily converted to global coordinates defined in relation to a known global referencing system, and the proprietary addresses are unique to the geographical area. The second patent relates to providing a geographical identifier for a multiple listing service involving real estate properties. This system uses GPS or manual entry to determine the starting location and uses a previously assigned district and locational grid to provide a routing map for a specific location that is progressively stored in a database. This system requires manual inputs of various data, which are lengthy and cause the user to take his or her eyes off the road.

U.S. Pat. No. 7,103,472 to Itabashi discloses an information terminal apparatus, a navigation system, an information processing method, and a computer program. A configuration is provided which allows users, such as children, who cannot sufficiently read map information to easily perform positional confirmation. An information terminal apparatus carried on a user includes an image data storage block storing actually taken image data of two or more geographical points in an area in which positional information is to be provided and a positional information database storing the correlation data between the identifiers of image data stored in the image data storage block and the positional information. On the basis of the positional information obtained from a positional information capture block, the image data identifier corresponding to the positional information is obtained from the positional information database. The actually taken image data are obtained from the image data storage block based on the obtained image data identifier, and the obtained actually taken image data are displayed on a display block. This novel configuration allows the user to instantly determine the actually taken video, which matches the surrounding view for easy positional confirmation. Instead of providing maps that may not be easily followed by children, the '472 system displays two dimensional or three dimensional images on locations during route and at final destination for location recognition. The system does not utilize GPS, but instead relies on stored image data communicated to the device through the Internet from a server. The method of selection of a final destination and the ease of this procedure is not indicated.

U.S. Pat. No. 7,292,937 to Kuroda et al. discloses a navigation system, data server, traveling route establishing method and information providing method. This navigation system is a portable information processing device. The device has a control program, data server, information processing server, navigation method, traveling route establishing method, information providing method, and area information providing method. This system uses units in a vehicle, which scan a map code or bar code. The information is transmitted to a data server, which converts the scanned data to area information and communicates the area information to the vehicle on-board navigator. The user does not enter anything into the navigator; but instead relies on this complex process of scanning bar codes and map codes. The bar codes and map codes may not be present for every address and points of interest.

U.S. Patent Application 2008/0133124 to Sarkeshik discloses location codes for destination routing. This method is for identifying particular geographic locations by means other than the postal address for use in navigation system and navigation, routing and mapping programs. The method may be the assignment of a series of numbers, symbols or characters, or a combination thereof, to a particular entity, location or address within a defined parameter. The address and location information is coded by the user into a series of alpha-numeric and special characters. The user needs to enter into the main system both the starting location code and the destination code. The navigation unit may not have a GPS and the direction is determined from software resident in the device. Because of these features, the device is not a GPS navigator at all times and the GPS unit does not map the route from a present location to a destination location.

Non Patent Published Literature "Magellan Does the Dash Thing: Maestro Elite 5340 Connected GPS with Google Local Search to Feature Unparalleled Ease of Use with One Touch Access to User Favorites" @ http://gizmodo.com/341113/magellan-does-the-dash-thing-maestro-elite-5340%252Bgprs-connected-gps-with-google-local-search discloses a navigation system that is integrated with Google Local Search. LAS VEGAS—Jan. 6, 2008—Magellan, the world's fastest-growing GPS brand, today premiered its Maestro Elite 5340+GPRS connected auto navigation unit featuring Google Local Search that enables users to get deep, location-specific information on the go. Scheduled to ship in Q1 2008, the Magellan Maestro Elite 5340+GPRS will be the first GPS model to enable users to search for local events—from concerts to local library events—as well as local businesses and services. Magellan will be showcasing its new products in its booth at the 2008 Consumer Electronics Show booth (no. 31247) beginning Monday, Jan. 7, 2008. Accessible on the Maestro Elite 5340+GPRS connected navigation device is Google's real-time local search enabling users to search the Web for businesses in a specific neighborhood, providing detailed, Internet-based information about those businesses—not just the business name or category. For example, users can search for "Star Wars" and find "Target" and "JPM Comics," among others, or get recommendations for the best banana cream pie near their point of reference. Users simply type in what it is they are looking for and Google displays relevant results around the user's current location or a user-specified location. Through the new Maestro Elite 5340's wireless GPRS connection, Magellan also delivers real-time traffic information, local weather forecasts, and makes it possible for users to wirelessly send addresses and notes to the GPS device directly from a PC with an Internet connection. The user can send destination addresses to the Maestro Elite 5340+GPRS in advance of the trip or have someone at home or back in the office send information from the Magellan website directly. The Magellan Maestro Elite 5340+GPRS is the company's premiere GPS model. Like all of the newly introduced Elite models, it provides rendered 3-D landmarks and buildings; 6 million points of interest (POI); a USB port; and advanced voice command functionality. The Maestro Elite 5340+GPRS also features a 5-inch WQVGA widescreen; a 533 MHz S-Media 3362 processor; and the ability to perform deep searches on local areas and receive information sent from a PC for on-the-fly changes. Thing publication discloses a Internet enabled Google Live Search device. This device does not provide easy entry of destinations for the driver without taking the eyes off the road.

Notwithstanding the efforts of prior art workers to provide improvements to a GPS system, there is clearly a need for a GPS system that enables the driver to enter direction requests from a current location to a desired residential or business address with minimal typing of data. Such a GPS device would significantly reduce the time during which the driver diverts his focus from the roadway. A GPS device that allowed data entry with minimal keystrokes would increase the margin of safety during driving and reduce accidents.

SUMMARY OF THE INVENTION

The present invention relates to a GPS/navigation system utilizing navigation codes to correlate with residential and business addresses. Each of these unique navigation codes is correlated with a residential and business address. The codes, with their correlating addresses, are stored in a database within the GPS/navigation system. The database communicates with a GPS system or navigation system so that when a user inputs a navigation code into the GPS system, the address appears on the system and directions to the address are displayed. Generally stated, the invention is directed navigation codes/GPS codes that correlate to any address, so that when a navigation code is entered into a navigation or GPS system, directions to the correlating address are displayed by the navigation system. The GPS Navigation Code System broadly comprises: (i) a plurality of addresses each correlated with a unique navigation code; (ii) a database for collecting said addresses and said unique navigation codes and correlating and storing each of said addresses with said unique navigation code; and (iii) the database being in communication with a GPS system or navigation system so that upon entry of the unique navigation code into the GPS system the address appears on the system and navigation directions are displayed by the GPS Navigation Code System monitor. The user may also provide the navigation code entry by speaking to the GPS navigation code system instead of typing the data of the navigation code using the keyboard. The address, navigation code and recorded speech pattern may be reassigned, rerecorded or entirely erased and rerecorded prior to driving on a trip.

In its preferred embodiment, the GPS Navigation Code System of the present invention comprises:

i) a GPS navigation device with display, memory, a processor, software generated or hardware data entry keyboard, sound input and sound output;

ii) said GPS navigation device being programmed by a user using software generated or hardware data entry keyboard to record various addresses and points of interest;

iii) said user assigning a two or three keystroke contracted navigation code reference to each of the addresses and points of interest;

iv) said user recording a speech pattern of sounds for each of the navigational codes for each of the addresses and points of interest;

v) said GPS navigation device storing and linking said addresses, points of interest, contracted navigational code reference and speech pattern of sounds in three linked separate databases;

vi) at any time, the user pressing a special key on the GPS navigation device to thereby set the device in address search mode, whereupon a desired address is retrieved from the stored database and displayed in the monitor when the user types few characters on the software generated or data entry keyboard or speaks the previously assigned speech pattern of sounds;

vii) said user accepting the displayed address by pressing a special key and canceling the address search mode of said GPS navigation device; and viii) said GPS navigation device calculating the route to the desired address selected and displaying the route on the display as well as providing voice generated guidance;

whereby the user after pressing the special key on the GPS navigator device spends a shorter time entering few navigational code characters or speaking the previously assigned speech pattern when retrieving the destination address, thereby avoiding distractions from vehicular driving duties, increasing the margin of safety for the driver, passengers and others in the vicinity of the vehicle.

BRIEF DESCRIPTION OF THE DRAWINGS

The invention will be more fully understood and further advantages will become apparent when reference is made to the following detailed description of the preferred embodiments of the invention and the accompanying drawings, in which:

FIG. 1 illustrates a schematic overview of the GPS Navigation Code System; and

FIG. 2 illustrates the GPS navigation code device.

DETAILED DESCRIPTION OF THE INVENTION

Use of navigation through global positioning systems (GPS) has become instrumental in both the private and the public sector. More and more vehicles are equipped with these systems and, when not provided through the manufacturer of the vehicle, consumers can readily purchase portable systems appointed to be mounted within their vehicle. Currently, navigation address entry requires many keystrokes, which activity is not readily carried out in a safe, time efficient manner, especially when the vehicle is in motion. There exists a need in the art for a set of codes that uniquely identify any address so that a user can simply enter the unique identifier code that correlates with the address to be mapped, thereby avoiding the need for cumbersome, time consuming and oftentimes distracting typing procedures otherwise required to effect entry of the address into the system. The GPS Navigation Code System of the present solves this problem by associating unique navigation code identifiers with each address so that entry into the GPS system is accomplished using a minimum number of keystrokes or by speech, with minimum attention diverted from driving during data entry.

This invention relates to navigation codes/GPS codes that correlate to any address. One of these navigation codes is entered into or spoken into a navigation or GPS system. After pressing a request button, the system shows the name and address of the selected destination, which is confirmed when the user presses the request button. The system calculates directions to the correlating address from the current location and displays the directions in the GPS Navigation Code System monitor. The GPS Navigation Code System broadly comprises: (i) a plurality of addresses each correlated with a unique navigation code that are previously entered through software generated or hardware keyboard or communicated by speech; (ii) a database for collecting said addresses and said unique navigation codes, and correlating and storing each of said addresses with said unique navigation code; and (iii) the database being in communication with a GPS Navigation Code System so that upon entry of the unique navigation code into the GPS system the address appears on the monitor and navigation directions are displayed by the GPS Navigation Code System monitor.

Generally stated, the invention comprises a GPS navigation system that has a display, preferably an LCD display, memory, preferably both ROM for the software needed to drive the GPS navigator device and RAM to store user entered addresses, contracted references and speech patterns assigned to each of the plurality of addresses. The GPS navigation device has a processor which stores the entered data of through addresses the keyboard, corresponding navigation code for each address entered through keyboard or provided as speech recorded through a microphone and stored in three separate linked databases within the device. This link between entries allows the retrieval of the address upon keyboard entry of a small number of characters or previously assigned speech pattern of the navigation code. In order to enter into this search pattern, a special key is pressed in the GPS navigator device and the retrieved addressed is accepted by the user by pressing the special key. The retrieved address is passed to the GPS navigator process and the device computes the route from the present location to the address recovered. The user may be provided with the usual options, including: 'shortest time', 'shortest distance', 'use mostly freeways' and 'avoid freeways'. The display shows the map, and voice generated instructions guide the user on a turn-by-turn basis, directing the user to the retrieved address from the present location.

FIG. 1 illustrates a schematic overview of the GPS Navigation Code System, shown generally at 10. The GPS Navigation Code System 10 broadly comprises a plurality of addresses 11a-n each correlated with a unique contracted reference navigation code 12a-n and previously assigned sound patterns 13a-n, which are stored in a database 14. Address 11a is correlated with unique contracted reference navigation code 12a and assigned speech pattern 13a. Database 14 collects addresses 11a-n unique contracted reference navigation codes 12a-n and assigned speech patterns 13a-n in three separate databases and correlates the same. In turn, database 14 is in communication with a GPS system 15 or navigation system so that when a user enters the unique navigation code 13a-n (13a) into their vehicle/personal GPS 15, the address 11a-n (11a) appears on the system 15 and navigation directions are yielded to the user. All addresses 11a-n and any latitude or longitude coordinate, such as points of interest, camp grounds, etc., will be assigned a code or unique contracted reference navigation code 12a-n and speech patterns 13a-n. In operation, all the user has to do is enter the unique contracted reference navigation code 12a . . . b, c . . . -n, generally consisting of a sequence of letters and/numbers, for example, as shown via 12a, Su1, into their system 10 or speak the speech pattern into microphone 16 and the system will calculate and yield directions to the correlating address 12a . . . b, c . . . -n. The system GPS 15 receives data from satellites 17. Thus, the process for entering addresses or speaking into a microphone in accordance with a previously assigned speech pattern in the GPS navigation system is dramatically simplified and thereby converted to a much more efficient process. The address search mode is activated by pressing a special key 18, shown in this case as a button and entering the unique navigation code through keyboard 19 or speaking into the microphone 16, at which point, the monitor displays the address. The user accepts the address by pressing the special key 18 and canceling the address retrieval mode and the GPS Navigation Code device calculates the direction to the selected address from the present location.

FIG. 2 illustrates the GPS navigation code device. It has microphone 16, a keyboard 19 and a special key shown as a button at 18. When the special key 18 is pressed by the user, the GPS navigation code device enters the address search mode and waits for user's keyboard input for the navigation code or previously recorded speech patterns through microphone 16. Upon receipt of the navigation code, the device retrieves the address and presents the address in the monitor. The user accepts the address by pressing the special key again, returning the GPS navigation code unit to seek direction to the selected address from the current location. The direction is indicated in the monitor and turn-by-turn direction instruction is provided by voice guidance.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A GPS Navigation Code System comprising:
   (a) a GPS navigation device having a display monitor, a memory, a processor, a software generated or hardware data entry keyboard, a sound input, a sound output and a special key for activating an address search;
   (b) said GPS navigation device being programmable by a user, using said software generated or hardware data entry keyboard to record various addresses and points of interest in said memory;
   (c) said GPS navigation device being able to allow said user to assign and store in said memory a reference code to each of the programmed addresses and points of interest, said reference code being a few keystrokes;

(d) said GPS navigation device being able to allow said user to record in said memory a unique speech pattern of sounds to correspond with each of the reference codes;

(e) said GPS navigation device being able to store and link said addresses, points of interest, reference codes and speech patterns in three linked separate databases stored in said memory;

(f) said address is retrieved by either entering said reference code or by speaking said corresponding speech pattern of sounds after activating address search mode by pressing said special key;

(g) said GPS navigation device being able to allow the user to press the special key to thereby set the device in address search mode, whereupon a desired address is retrieved from the stored database and displayed on the monitor when the user enters the corresponding reference code into the GPS navigation device on said software generated or hardware data entry keyboard, or alternatively said desired address may be retrieved from the stored database and displayed on the monitor when the user speaks the previously assigned speech pattern of sounds;

(h) the GPS navigation device being able to allow said user to accept the address displayed on said monitor by pressing the special key, thereby simultaneously canceling the address search mode of said GPS navigation device; and (i) said GPS navigation device being able to calculate the route to the desired address and display the route on the display as well as provide voice generated guidance, whereby the user after pressing the special key on the GPS navigator device spends a shorter time entering the reference code or speaking the previously assigned speech pattern when retrieving the destination address.

2. The GPS Navigation Code System as recited by claim 1, wherein the addresses and reference codes are pre-programmed by the user prior to driving in an automobile.

3. The GPS Navigation Code System as recited by claim 1, wherein the addresses, reference codes and speech patterns may be individually changed and reassigned or entirely erased and reprogrammed prior to driving on a trip.

4. The GPS Navigation Code System as recited by claim 1, wherein said reference code comprises at least 2 keystrokes.

5. The GPS Navigation Code System as recited by claim 4, wherein said reference code comprises from 2 to 10 keystrokes.

6. The GPS Navigation Code System as recited by claim 5, wherein said reference code comprises from 4 to 8 keystrokes.

7. The GPS Navigation Code System as recited by claim 6, wherein said reference code comprises from 5 to 7 keystrokes.

* * * * *